United States Patent [19]

Takechi et al.

[11] Patent Number: 4,936,105
[45] Date of Patent: Jun. 26, 1990

[54] OPERATION CONTROL SYSTEM FOR A COOLING CYCLE

[75] Inventors: Junko Takechi; Syunro Kawaguchi; Toshiyuki Shibutani, all of Yokohama, Japan

[73] Assignee: Kabushiki Kaisha Toshiba, Kawasaki, Japan

[21] Appl. No.: 415,105

[22] Filed: Oct. 2, 1989

[30] Foreign Application Priority Data

Sep. 30, 1988 [JP] Japan .................................. 63-246223

[51] Int. Cl.⁵ ............................................ G01K 13/00
[52] U.S. Cl. ........................................ 62/129; 62/231; 165/11.1
[58] Field of Search ......................... 236/94; 165/11.1; 62/126, 129, 231

[56] References Cited

U.S. PATENT DOCUMENTS 4,574,871  3/1986  Parkinson .......................... 236/94 X
4,827,730  5/1989  Doi et al. .......................... 62/129 X Primary Examiner—William E. Wayner
Attorney, Agent, or Firm—Foley & Lardner, Schwartz, Jeffery, Schwaab, Mack, Blumenthal & Evans

[57] ABSTRACT

Disclosed is an operation control system for a refrigerator which can prevent extreme change of the internal temperature by an extra method when abnormality occurs in its cooling state. This system judges whether the temperature change is abnormal or not, stops an operation control method based on temperature when the change is abnormal, and controls the operation of the refrigerator by another operation control method based on time in which the stop and the restart are repeated at predetermined intervals respectively.

6 Claims, 5 Drawing Sheets

OPERATION CONTROL SYSTEM FOR A COOLING CYCLE

BACKGROUND OF THE INVENTION

1. Field of the Invention

The present invention relates to an operation control system for a cooling cycle, which is able to keep a minimum cooling function to be required till normal return is conducted when abnormality is detected in the cooling cycle.

2. Description of the Prior Art

As a conventional refrigerator having an abnormality detecting function, for example, there is a refrigerator having a self-check function.

Herein, the term "self-check function" means a self-control-check function for effecting a process to be conducted in parallel with each program process of each function of a refrigerator, that is, it judges whether each operation of each the function is normal or not and inform a service manor the like of abnormality of the refrigerator with LED provided on a control panel thereof. However, in this case, the standard of the judgement of normal or abnormal is flags formed based on judgement of sensor values and state input successively inputted all the while of the program processes, thus are not given any specific processes to the abnormality itself.

Namely, in case of a conventional refrigerator, even though it is equipped with an abnormality detecting function, when some abnormality occurs, it does only inform a service man or the like of the abnormality. Accordingly, when the abnormality occurs in its cooling function, temperature in the refrigerator becomes abnormally high or low, thus articles contained in it are likely to be decomposed or frozen, furthermore there occurs frequently a case that a user of such a refrigerator does not know its abnormality until articles in it are damaged.

SUMMARY OF THE INVENTION

The present invention was invented in the light of the above circumstances, therefore it is an object of the present invention to provide a refrigerator which can automatically keep a minimum cooling function to be required on occurrence of abnormality so as to prevent occurrence of damage to articles contained in it, at the same time, warn a user or the like of the generation of the abnormality, check a cooling state in it and judge whether the state reaches a normal return or not, then return an operation of its cooling system to a normal cooling operation automatically when the normal return is confirmed by the judgement.

In order to achieve the above object, a feature of the present invention is a refrigerator comprising refrigeration cycle curve storage means for storing refrigeration cycle curve on a normal operation, state input means for inputting information of a cooling state of the refrigerator in operation, refrigeration cycle curve preparation means for preparing a refrigeration cycle curve in operation based on the information from the state input means, refrigeration cycle comparison means for comparing the refrigeration cycle curve in operation prepared by the refrigeration curve preparation means and the refrigeration cycle curve on the normal operation, fail-safe control means for switching control of a cooling system of the refrigerator from control based on temperature to control based on time when some abnormality of the refrigeration cycle is detected by the comparison of the refrigeration cycle comparison means.

While, another feature of the present invention is a refrigerator as said above further comprising temperature sensor operation confirmation means for confirming whether an operation of a temperature sensor is normal or not when the cooling system is switched to the control based on time by the fail-safe control means, and warning means for giving warning when the temperature sensor is judged to be not normal by the temperature sensor operation confirmation means.

Moreover, still another feature of the present invention is a refrigerator as said above further comprising return check means for checking the refrigeration cycle curve in operation prepared by the refrigeration curve preparation means and judging whether the refrigeration cycle curve returns to the normal state, that is, normal return is conducted when the temperature sensor is judged to be normal by the temperature sensor operation confirmation means, normal return control means for returning the control based on time of the cooling system by the fail-safe control means to the control based on temperature when the refrigeration cycle curve is judged to be returned to the normal state by the return check means, cause search means for searching causes of abnormality based on the refrigeration cycle curve in operation prepared by the refrigeration cycle curve preparation means when the normal return is denied by the return check means, and cause processing means for effecting proper processes against the causes of abnormality based on results from the cause search means.

According to the above construction, when the refrigeration cycle curve in operation is compared with the refrigeration cycle curve on the normal operation, and some abnormality is detected in a refrigeration cycle in operation, the control of the cooling system is switched from the control based on temperature to the control based on time, and the minimum cooling function to be required is automatically kept. Accordingly, there can be prevented occurrence of damage, such as decomposition and freezing, to articles contained in the refrigerator.

Moreover, when is detected the abnormality in the refrigeration cycle as stated above, confirmation whether the operation of the temperature sensor is normal or not is conducted, and when the operation of the temperature sensor is judged to be not normal, warning is given outside.

Furthermore, when is judged the operation of the temperature sensor to be normal and the normal return of the state of the refrigeration cycle in operation is confirmed, the control of the cooling system is returned to the control based on temperature for the normal operation thereof. While, when the normal return is judged to be impossible, causes of the abnormality are searched, and some proper processes against the causes, for example, warning such as "Please shut the door", are conducted.

These and other objects, features and advantages of the present invention will be more apparent from the following description of preferred embodiments, taken in conjunction with the accompanying drawings.

DETAILED DESCRIPTION OF THE PREFERRED EMBODIMENTS

Hereinafter embodiments of the present invention will be described with reference to FIGS. 1 to 4.

Figure 1:
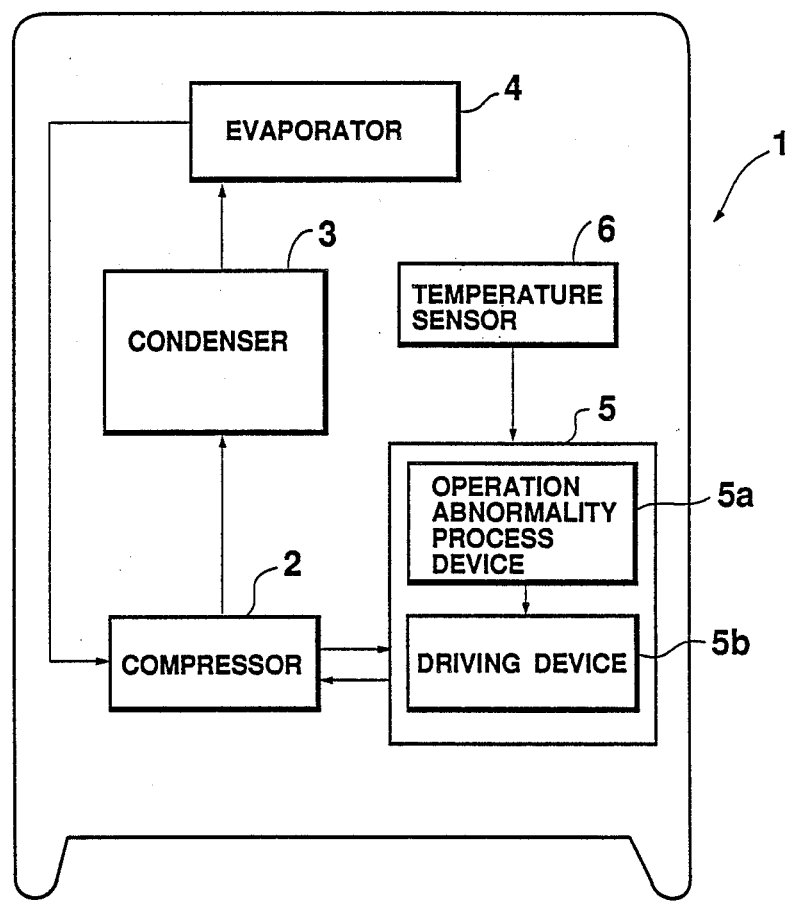
FIG. 1 is a view to show a schematical construction of a refrigerator using a control system of the present invention.

FIG. 1 is a schematical diagram to show a diagram using a control system according to the present invention. This refrigerator 1 has a compressor 2, condenser 3 for condensing a compressed coolant, and an evaporator 4 for evaporating the condensed coolant and returning it again to the compressor 2. An operation of the compressor 2 is controlled by a control system 5, and the control system 5 stops and starts suitably based on temperature detected by a temperature sensor 6 provided in the refrigerator 1. Moreover, this control system 5 comprises an operation abnormality processing device 5a for detecting abnormality in operation and processing it, and driving device 5b 'for controlling an operation of the compressor 2.

Figure 4:
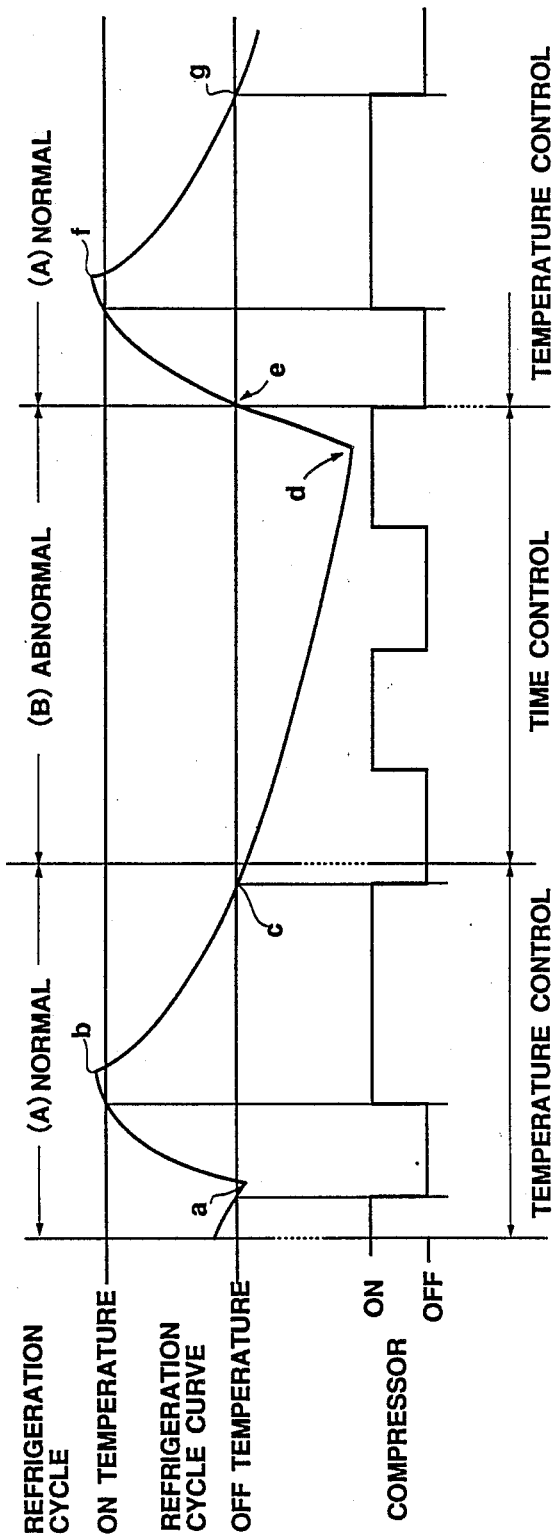
FIG. 4 is an example of control of a refrigerator according to the present invention.

Next, a control operation of the control system 5 will be described with reference to FIG. 4.

To the control system 5 are set a predetermined suitable maximum temperature (ON temperature) and a predetermined minimum temperature (OFF temperature), and the system 5 stops the operation of the compressor 2 at a time when a value designated by the temperature sensor 6 becomes lower than the OFF temperature, and restarts the operation of the compressor 2 at time b when the value becomes higher than the ON temperature. Namely, this control based on temperature (temperature control) as designated by Normal Section A shown in FIG. 4.

While, when the abnormality in operation occurs, for example, when temperature in the refrigerator 1 becomes lower than the OFF temperature (at a time c) and further continues to fall, the operation abnormality processing device 5a switches control of the compressor 2 from the temperature control to control based on time (time control). During the time control, as shown by Section B in the diagram, operation and stop re repeated at predetermined intervals. The respective lengths of the operation period and the stop period are suitably set corresponding to a state of the refrigerator 1.

By this process, even though an internal temperature of the refrigerator is not kept between the O temperature and OFF temperature, a cooling function effective to an extent is kept and does not deviate from the range so much. While, when the operational abnormality can be removed by some proper processes, and the normal operation is confirmed (at a time e), the control of the compressor 2 is switched to the temperature control again.

Figure 2:
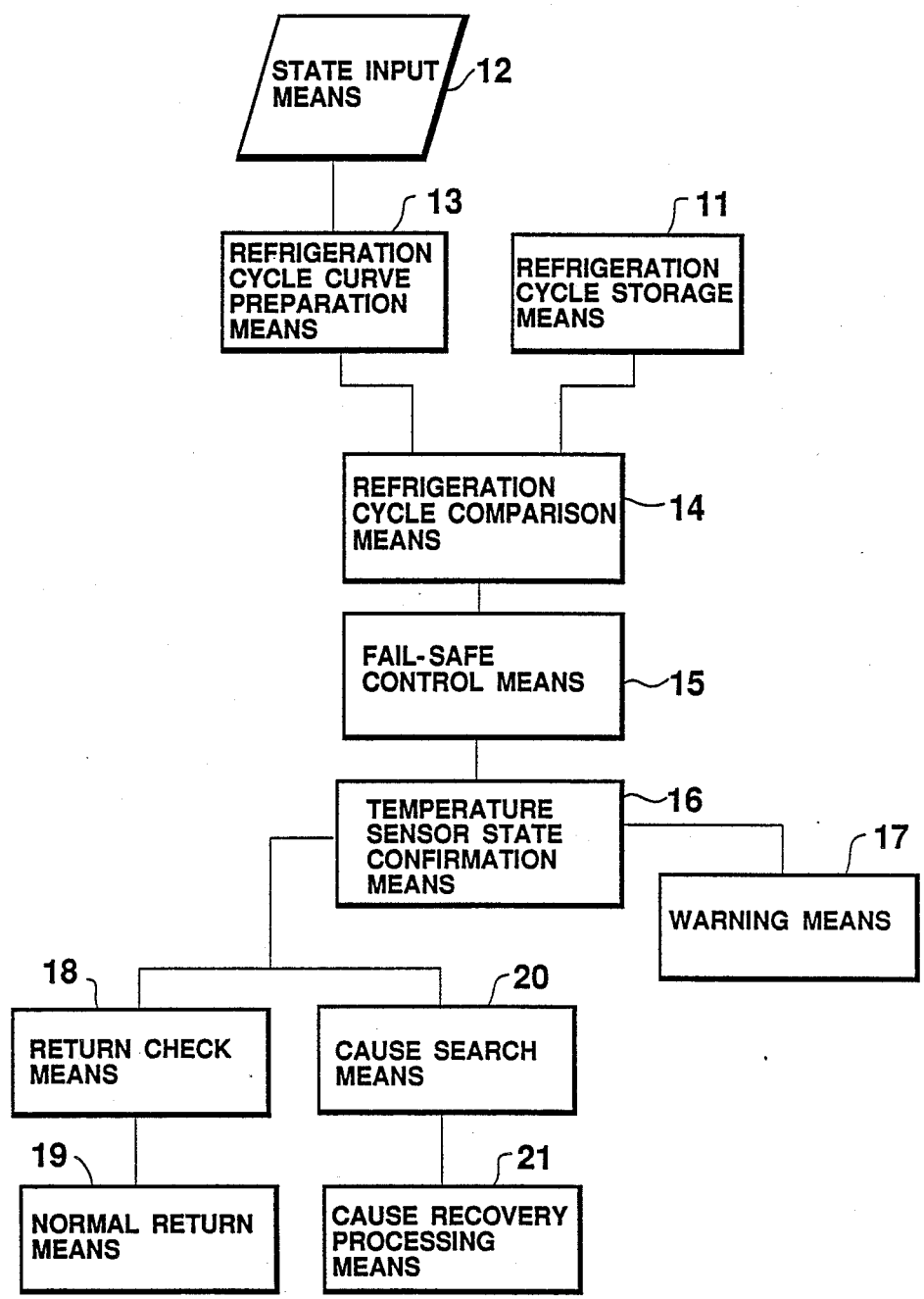
FIG. 2 is a block diagram to show construction of the control system of the present invention.

Next, construction of the operation abnormality processing device 5a will be described with reference to FIG. 2.

In the diagram, reference numeral 11 designates refrigeration cycle curve storage means for storing information, such as periods, gradients and amplitudes of vibration of a refrigeration cycle curve on normal operation, and RAM and the like is used therefor. While, reference numeral 12 designates state input means for inputting information and ON/OFF states from a temperature sensor and other functions in operation, 13 designates refrigeration cycle curve preparation means for preparing a refrigeration cycle curve in operation based on information from the state input means and a cooling time elapsed, 14 designates refrigeration cycle comparison means for comparing the refrigeration cycle curve in operation prepared by the refrigeration cycle curve preparation means 13 and the refrigeration cycle curve on the normal operation, and 15 designates fail-safe control means for switching control of a cooling system from control based on temperature to control based on time when abnormality of the refrigeration cycle is detected in the comparison by the refrigeration cycle comparison means. Moreover, reference numeral 16 designates temperature sensor operation confirmation means for judging whether a temperature sensor is normal or abnormal when abnormality of the refrigeration cycle is detected, and 17 designates warning means for warning a user or the like when the temperature sensor is judged to be abnormal by the sensor operation confirmation means 16, and as the warning means 17, for example, a buzzer or a lamp is used.

Furthermore, reference numeral 18 designates return check means for checking the refrigeration cycle curve in operation prepared by the refrigeration cycle curve preparation means 13 and judging whether the refrigeration cycle curve returns to the normal state when the temperature sensor is judged to be normal by the temperature sensor operation confirmation means 16, 19 designates normal return control means for returning the control based on time of the cooling system by the fail-safe control means 15 to the control based on temperature when the refrigeration cycle curve is judged to be returned to the normal state by the return check means 18, 20 is cause search means for searching causes of abnormality based on the refrigeration cycle curve in operation prepared by the refrigeration cycle curve preparation means 13 when the normal return is denied by the return check means 18, and 21 is cause processing means for effecting some proper processes, for example, warning to a user, such as "Please shut the door", based on the result of the cause search means 20.

Figure 3:
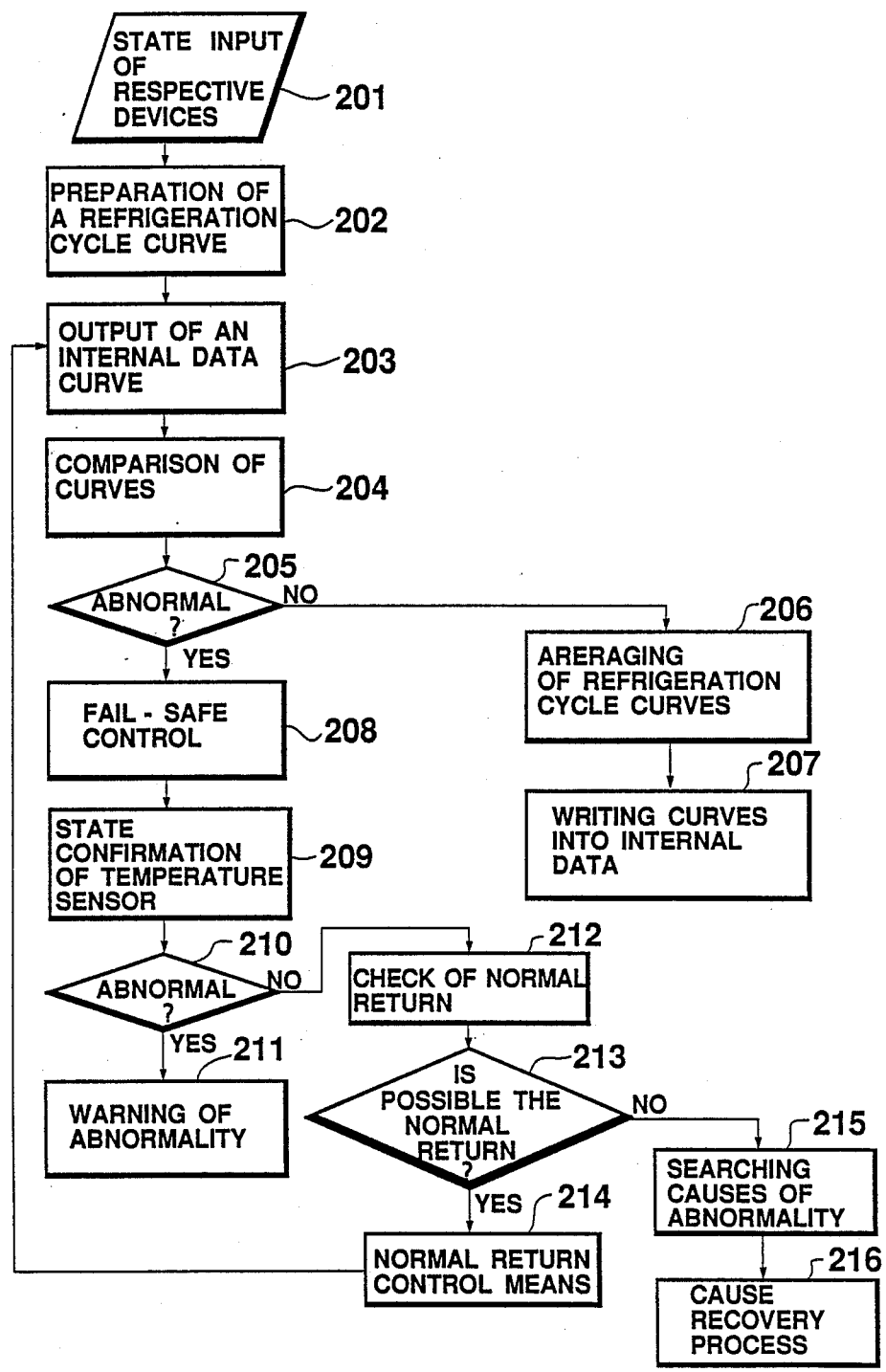
FIG. 3 is a flow chart to show an operation of the control system of the present invention.

Next, operation of a refrigerator constructed as mentioned above will be described with reference to the flow chart in FIG. 3 and the refrigeration cycle curve in FIG. 4.

A refrigeration cycle curve (Section A in FIG. 4) in normal operation of the refrigerator is stored in advance as internal data in the refrigeration cycle curve storage means 11 comprising RAM and the like.

First, temperature sensor values and ON/OFF states of devices in cooling operation are inputted from the state input means 12 to the refrigeration cycle curve preparation means 13 (Step 201).

Then, a refrigeration cycle curve is prepared based on these input information and a cooling time elapsed by the refrigeration cycle curve preparation means 13 (Step 202).

Subsequently, a refrigeration cycle curve on normal operation is outputted from the refrigeration cycle storage means 11 (Step 203), and the refrigeration cycle curve on normal operation is compared with the refrigeration cycle curve in operation by the refrigeration cycle comparison means 14 (Step 204).

In this case, as a comparison method in the comparison means 14, for example, there may be used a method in which both a maximum value and a minimum value in each the cycle are compared with each other, and similarity of both the cycles is judged by comparing the difference of both the values of each the cycle with a predetermined value.

As the result of the comparison check, when both the cycles are judged to be substantially similar to each other, a cooling function of the refrigerator is judged to be normal (No in Step 205), and both the refrigeration cycle curves are averaged (Step 206), then a refrigeration cycle curve obtained by the averaging is newly written in the refrigeration cycle curve storage means (Step 207).

On the other hand, in the result of the above comparison check, when is recognized a remarkable difference between both the refrigeration cycle curves, the cooling function of the refrigerator is judged to be abnormal (Yes in Step 205, or Section B in FIG. 4), and control of the cooling system is switched by the fail-safe control means 15 from the control based on temperature on the normal operation (Section A in FIG. 4) to the control based on time or intermittent control (Section B in FIG. 4) so that a minimum cooling function to be required is kept (Step 209).

Moreover, in the results the comparison check by the comparison means 14, when the abnormality is detected, the operation state of the temperature sensor is also confirmed by the temperature sensor operation confirmation means 16 (Step 209).

In the results of the confirmation, when the temperature is confirmed to be abnormal (Yes in Step 210), warning against the abnormality is given to a user or the like by warning means 17 (Step 211). The confirmation of the abnormality of the temperature sensor is conducted, for example, by checking whether output from the temperature sensor becomes an abnormal value.

While, when the temperature is confirmed to be not abnormal (No in Step 210), the cooling state is further inputted into the return check means 18, then the refrigeration cycle curve in operation is checked and whether the cycle curve returns to the normal state is judged by the return check means 18 (Step 212). In the case of the normal return (Yes in Step 213), the control of the cooling system once switched into the control based on time is returned to the control based on temperature by the normal return control means 19 (Step 214). While, in case of confirmation of abnormality of the temperature (No in Step 213), causes are searched by the cause search means 20 based on the refrigeration cycle curve prepared previously (Step 215), and some processes to be required against the abnormality, for example, warning such as "Please shut the door" and efficient cooling, are carried out by the cause processing means 21 from the results of the search (Step 216).

Figure 5:
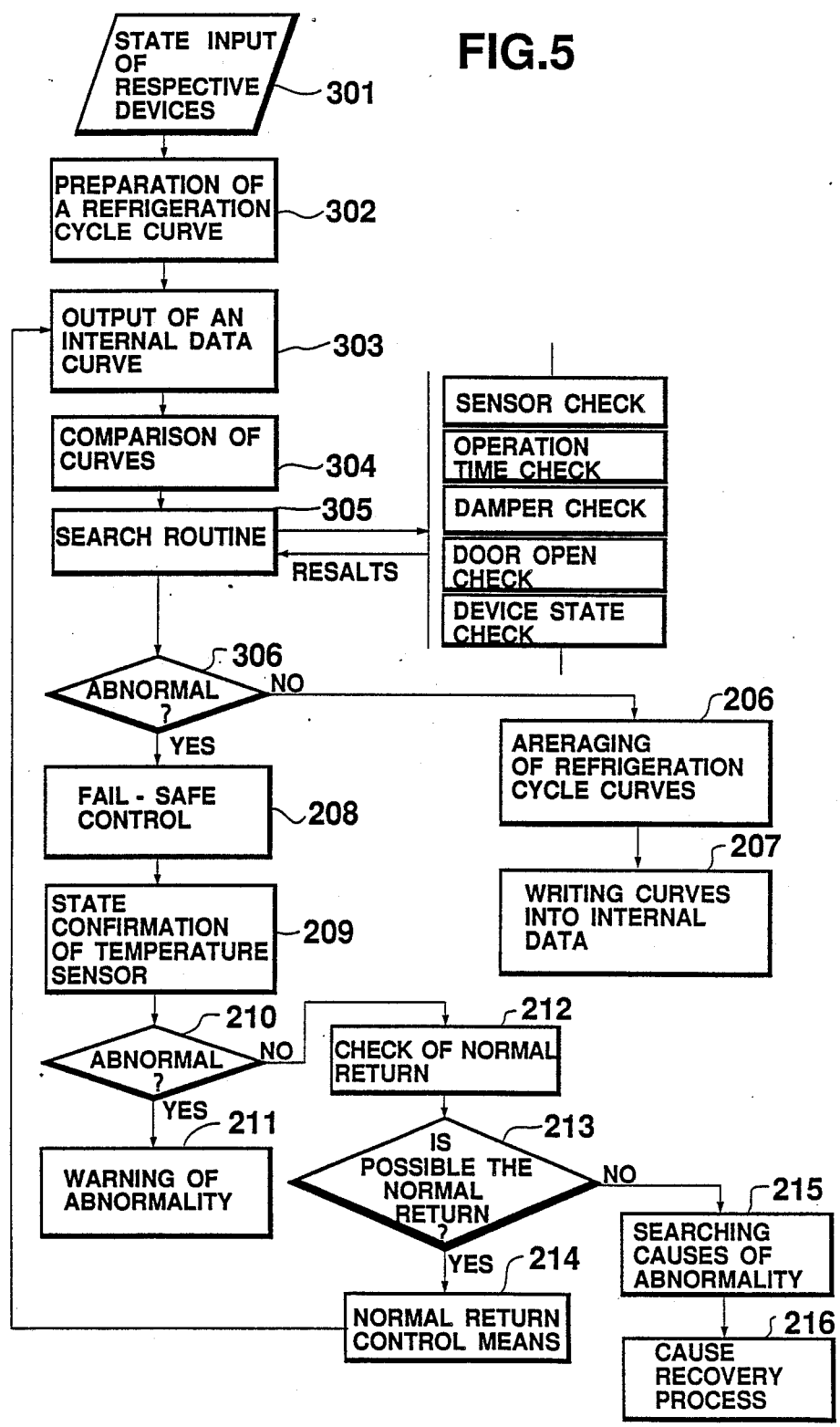
FIG. 5 is an modified example of the present invention.

In FIG. 5, a modified example of the above embodiment is shown, wherein a flow from Step 301 to Step 304 is the same as that from Step 201 to Step 204. In this example, after the comparison of the curves (Step 304), a search routine is provided at Step 305, and the causes of abnormality are searched therein. Then, are judged whether the comparison results of the curves and the search results by the search routine are abnormal or not at 306. Since the following operations after Step 306 are the same as portions respectively corresponding to them in the embodiment shown in FIG. 3, detailed description for them is omitted.

Next, examples of searching methods to the causes of abnormality to be searched in Step 305 will be described.

First is investigated abnormality in output from a sensor, such as a damper sensor and a defrosting sensor, and when is found an abnormal value in the output, a judgement that the sensor is out of order is given.

Herein, the term "damper sensor38 means a read switch for detecting open and close of a damper for adjustment of a flow amount of a cooling air.

Secondly, is conducted checking whether operation times of the respective constructional devices and functional processing times for defrosting, direct freezing and the like satisfy predetermined conditions to be required. This check is carried out by measurement of an internal timer.

Also, is confirmed suitability in the open and close of the damper to a temperature state in a cooling chamber. This confirmation is conducted by a proper program.

Incidentally, is confirmed a state of open and close of a door of the cooling chamber, and a door contact switch is used therefor.

Furthermore, abnormality is detected by checking of an operation of the refrigerator in a special operative mode accompanied with open and close function switches and relays. Herein, the term "special operative mode" means to compulsorily drive the compressor in a direct refrigeration mode or a rapid cooling mode, or compulsorily stop the compressor in operation of a defrosting heater.

As stated above, in the comparison results between the refrigeration cycle curve in operation and the refrigeration cycle curve in normal operation, when abnormality is detected, the control of the cooling system is switched from the control based on temperature to the control based on time, thus a minimum cooling function is kept, so that there can be prevented occurrence of inconveniences, such as decomposition and freezing of articles contained in the refrigeration by inferiority in cooling.

Moreover, according to the above construction, when the abnormality is detected, the confirmation whether the operation of the temperature sensor is normal or not is conducted. Then, when the temperature sensor is judged to be inferior, warning is given outside, thus a user or the like of the refrigerator can know the occurrence of the abnormality immediately.

Furthermore, when the operation of the temperature sensor is judged to be normal, the control of the cooling system is returned to the control based on temperature for normal operation after the confirmation of the normal return of the refrigeration cycle curve in operation. While, in this case, when the normal return is judged to be impossible, the causes are searched and some proper processes to be required for a user or the like are carried out, thus damage caused on the occurrence of the abnormality can be controlled to be minimum, and also a time and trouble required for recovery can be controlled to be minimum.

Various modification will become possible for those skilled in the art after receiving the teachings of the present disclosure without departing from the scope thereof.

What is claimed is:

1. An operation control system of a cooling cycle for controlling an operation of a cooling device which cools objects at a suitable temperature, comprising:
   a temperature sensor for detecting temperature of the objects to be cooled;
   means for stopping or restarting the operation of the cooling device based on temperature detected by the temperature sensor;
   judgement means for inputting signals from the temperature sensor and judging whether the cooling by the cooling device is conducted normally or not; and
   means for continuing control based on temperature when the cooling operation is judged to be normal, and controlling the cooling device so that the cooling operation is repeated for a predetermined period at predetermined intervals when the cooling operation is judged to be abnormal.

2. The system according to claim 1, wherein the cooling device cools the objects such that a cooling operation is started when the temperature detected by the temperature sensor exceeds a predetermined maximum temperature, and the cooling operation is stopped when the temperature becomes lower than a predetermined minimum temperature.

3. The system according to claim 1, wherein, in the judgement means, a temperature change pattern corresponding to the normal cooling operation is stored, and judgement whether cooling is normally conducted or not is carried out by comparing the stored temperature change pattern with a temperature change pattern corresponding to the signals from the temperature sensor.

4. The system according to claim 1, further comprising:
   confirmation means for confirming abnormality of the temperature sensor when the cooling operation is judged to be abnormal.

5. The system according to claim 4, further comprising:
   means for giving warning when abnormality of the temperature sensor is confirmed by the confirmation means.

6. The system according to claim 4, further comprising:
   means for judging again whether the cooling operation is normal or not when the abnormality of the temperature is not confirmed by the confirmation means, and then restarting the control based on temperature when the cooling operation is judged to be normal.

* * * * *